(12) United States Patent  (10) Patent No.: US 8,013,028 B2
Glynn  (45) Date of Patent: Sep. 6, 2011

(54) EMBEDDED RECYCLED CONTAINER SHEET BINDER

(75) Inventor: Kenneth P. Glynn, Flemington, NJ (US)

(73) Assignee: B Green Innovations, Inc., Matawan, NJ (US)

( * ) Notice: Subject to any disclaimer, the term of this patent is extended or adjusted under 35 U.S.C. 154(b) by 92 days.

(21) Appl. No.: 12/584,023

(22) Filed: Aug. 31, 2009

(65) Prior Publication Data

US 2010/0183357 A1  Jul. 22, 2010

Related U.S. Application Data

(63) Continuation-in-part of application No. 12/321,406, filed on Jan. 21, 2009.

(51) Int. Cl.
*C08J 11/04* (2006.01)

(52) U.S. Cl. ............ 521/48; 521/40; 521/40.5; 528/480; 528/502 R; 528/502 C; 528/502 F; 528/503; 281/15.1; 281/21.2; 281/29; 281/31; 402/73; 402/74; 402/75; 402/76; 402/77; 402/80 P

(58) Field of Classification Search ............ 281/4, 15.1, 281/17, 19.1, 20, 21.1, 27.1, 29, 31, 34, 35, 281/36, 38, 40; 521/40, 40.5, 48; 528/480, 528/481, 502 R, 502 F, 503; 428/174, 411.1; 402/73, 74, 75, 76, 77, 78, 79, 80 P, 500; 264/460, 462, 138, 152, 159, 160, 163, 239, 264/248, 252, 259, 265, 472, 474, 476, 479, 264/481, 486

See application file for complete search history.

(56) References Cited

U.S. PATENT DOCUMENTS

| 5,468,779 A | 11/1995 | Yamamoto et al. |
| 5,879,797 A | 3/1999 | Kim |
| 2002/0098031 A1* | 7/2002 | Brown et al. .................. 402/73 |
| 2008/0145580 A1 | 6/2008 | McAllister et al. |
| 2008/0241455 A1 | 10/2008 | DiNello et al. |

* cited by examiner

*Primary Examiner* — James Seidleck
*Assistant Examiner* — Frances Tischler
(74) *Attorney, Agent, or Firm* — Kenneth P. Glynn; Bradford W. Bondor; Deirdra M. Meagher

(57) ABSTRACT

An embedded recycled container sheet binder includes a front cover and a back cover, the front cover and the back cover being connected to one another for opening and closing, at least one of the front cover and the back cover being, at least in part, a plurality of flattened recycled containers embedded in a plastic base, and each of the plurality of flattened recycled containers being visibly recognizable. The plurality of flattened recycled containers is preferably embedded between a base substrate of plastic and a top layer of plastic. The base substrate is a recycled plastic base substrate selected from the group consisting of clear plastic, opaque plastic, colored plastic and combinations thereof. In some preferred embodiments, the embedded recycled container sheet binder the top layer is a recycled plastic selected from the group consisting of clear plastic, opaque plastic and combinations thereof. In some preferred embodiments, the embedded recycled container sheet binder the front cover and the back cover are connected by a spine. In some preferred embodiments, the embedded recycled container sheet binder at least one of the front cover and the back cover has at least one pocket connected to it.

20 Claims, 8 Drawing Sheets

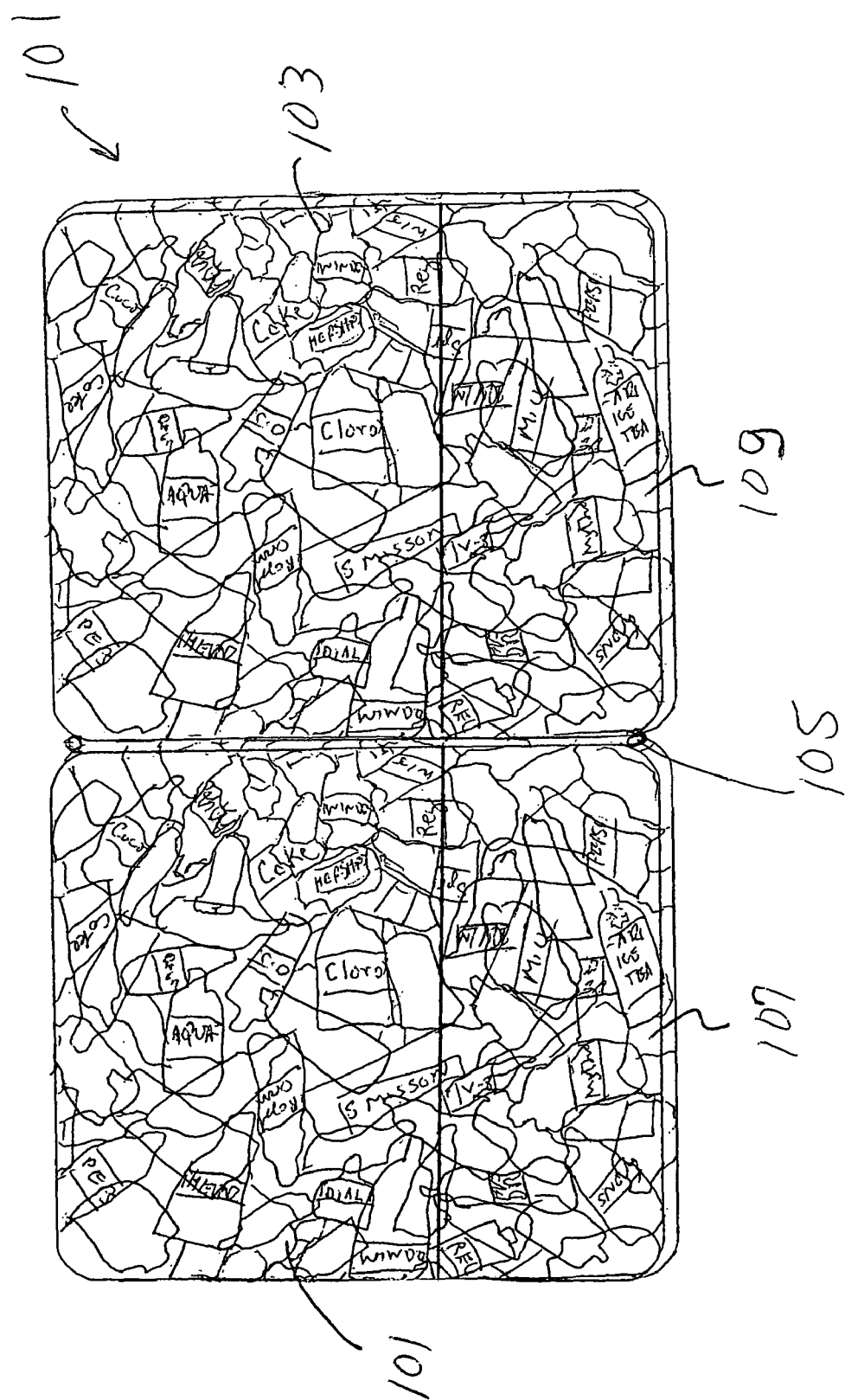

EMBEDDED RECYCLED CONTAINER SHEET BINDER

REFERENCE TO RELATED APPLICATIONS

This patent application is a continuation-in-part of copending U.S. patent application Ser. No. 12/321,406 filed on Jan. 21, 2009, entitled "Method of Producing Composite Recycled Bottle Sheet Products", having the same inventor as herein and having the same assignee as herein.

BACKGROUND OF THE INVENTION a. Field of Invention

The invention relates generally to binders, folders and book covers that visibly display flattened, recycled plastic containers. These products may be created by different methods, and one preferred method of producing these products involves creating sheets of plastic with embedded recycled plastic containers. The substrate plastics are clear to opaque on at least one side for displaying the recycled containers therethrough. The recycled plastic containers may be sterilized and prepared prior to the embedding process. They may be sliced. e.g., vertically, and are rendered flat by any available technique, such as partial melt, steam compression or other method. When heated, the heating is such that the bottles are slightly melted to deform and fused so that original characteristics of the bottles remain visible, if somewhat obscurely, such as color, design, labels, and shape. The prepared containers (In this context, "containers" means whole or cut, but still identifiable containers) are the placed in a molten or tacky substrate and are then topcoated with a top layer to create the finished product. The sheets may then be used to create the binder products that display the individual deformed bottles in a recognizable manner.

The word "binder" as used herein, refers to any type of flat covers that are directly or indirectly connected to one another for the purpose of permanently or temporarily holder papers or pages. These include ring binders, clip binders and other type of loose page or sheet-holding binders, notebooks, book binders, folders and folio carriers.

b. Description of Related Art

The following patents are representative of the field pertaining to creating plastic products:

U.S. Pat. No. 5,468,779 to Yamamoto et al. describes a plastic material with a paint film in coarse-crushed, and a film decomposition agent, e.g. a heterocyclic compound such as imidazolek, a triazine compound such as benoguanamine, a phenylendiamine compound such as N-phenyl-N-isopropyl-p-phenylene diamine, is added to the coarse-crushed material. The mixture is then heated and kneaded to dissolve the paint film and uniformly spread the particles of the paint film in the plastic material. The physical properties and surface quality of the plastic material are substantially the same as those of the original material.

U.S. Pat. No. 5,879,797 to Kim describes a novel matrix containing nephrite jade power as a main component. By using the matrix, a variety of goods in the field of medical goods, utensil goods, agricultural goods, industrial goods, fishery goods, traffic goods, transportation goods, equipment for sports, electronic instruments, precision instruments, or the like can be prepared. The goods made of the matrix can show excellent effects of treating pathological symptoms (headache, numb feeling, indigestion, insomnia, or the like), removing impurities (such as heavy metals), improving the quality of water, promoting the growth of plants by virtue of the inherent properties of nephrite jade.

United States Patent Publication US 2008/0020221 A1 describes systems and methods of generating a recycled output. The recycled output may include a fabric produced by fusing reclaimed plastic bags. The reclaimed plastic bags are fused together using a material manufacturing system. The system is typically configured to heat the plastic bags to a temperature wherein the plastic bags fuse together but do not completely melt. Some embodiments include the addition of different types of plastic or non-plastic materials to the recycled output. Also disclosed are systems and methods of controlling temperature and patterns within the recycled output.

United States Patent Publication US 2008/0145580 A1 discloses a recycled insulation material which includes plastic and/or rubber shredded or chopped up into individual pieces having random or semi-random sizes or semi-random air-pockets in between many of the individual pieces. The shredded or chopped up plastic and/or rubber pieces in combination with the air-pockets are configured to operate as an insulation filler for a variety of different panes, forms, pipes, conduits or any other item that requires insulation.

United States Patent Publication US 2008/0241455 A1 relates to an encapsulated member made with open molds for forming the exterior surface of the encapsulated member, wherein the encapsulation is accomplished with at least an outer skin configuration of a plastic, metal, ceramic or other moldable material for encapsulating pre-forms, reinforcements, sheeted materials, metallic pre-forms and other core materials that can be protected from the outer elements and manufacturing considerations. FIG. 3c shows an encapsulating reinforced member located within an open mold having skins thereon, and being filled with formable material.

Notwithstanding the prior art, the present invention is neither taught nor rendered obvious thereby.

SUMMARY OF INVENTION

The present invention is an embedded recycled container sheet binder. It includes a front cover and a back cover, the front cover and the back cover being connected to one another for opening and closing, at least one of the front cover and the back cover being, at least in part, a plurality of flattened recycled containers embedded in a plastic base, and each of the plurality of flattened recycled containers being visibly recognizable.

In some preferred embodiments of the present invention embedded recycled container sheet binder, the plurality of flattened recycled containers is embedded between a base substrate of plastic and a top layer of plastic.

In some preferred embodiments of the present invention embedded recycled container sheet binder, the base substrate is a recycled plastic base substrate selected from the group consisting of clear plastic, opaque plastic, colored plastic and combinations thereof.

In some preferred embodiments of the present invention embedded recycled container sheet binder, the top layer is a recycled plastic selected from the group consisting of clear plastic, opaque plastic and combinations thereof.

In some preferred embodiments of the present invention embedded recycled container sheet binder, the front cover and the back cover each have at least one straight edge and they are directly connected to one another at the at least one straight edge of each.

In some preferred embodiments of the present invention embedded recycled container sheet binder, both the front cover and the back cover are, at least in part, a plurality flattened recycled containers, and each of the plurality of flattened recycled containers are visibly recognizable.

In some preferred embodiments of the present invention embedded recycled container sheet binder, the base substrate is a recycled plastic base substrate selected from the group consisting of clear plastic, opaque plastic, colored plastic and combinations thereof.

In some preferred embodiments of the present invention embedded recycled container sheet binder, the top layer is a recycled plastic selected from the group consisting of clear plastic, opaque plastic and combinations thereof.

In some preferred embodiments of the present invention embedded recycled container sheet binder, the front cover and the back cover each have at least one straight edge and they are directly connected to one another at the at least one straight edge of each.

In some preferred embodiments of the present invention embedded recycled container sheet binder, at least one of the front cover and the back cover has at least one pocket connected to it.

In some other preferred embodiments of the present invention embedded recycled container sheet binder, the invention includes: a front cover, a back cover and a spine, the front cover and the back cover being connected to the spine for opening and closing, at least one of the front cover and the back cover being, at least in part, a plurality of flattened recycled containers, and each of the plurality of flattened recycled containers being visibly recognizable.

In some preferred embodiments of the present invention embedded recycled container sheet binder with a spine, the plurality of flattened recycled containers is embedded between a base substrate of plastic and a top layer of plastic.

In some preferred embodiments of the present invention embedded recycled container sheet binder with a spine, the base substrate is a recycled plastic base substrate selected from the group consisting of clear plastic, opaque plastic, colored plastic and combinations thereof.

In some preferred embodiments of the present invention embedded recycled container sheet binder with a spine, the top layer is a recycled plastic selected from the group consisting of clear plastic, opaque plastic and combinations thereof.

In some preferred embodiments of the present invention embedded recycled container sheet binder with a spine, both the front cover and the back cover are, at least in part, a plurality of flattened recycled containers, and each of the plurality of flattened recycled containers are visibly recognizable.

In some preferred embodiments of the present invention embedded recycled container sheet binder the binder with a spine, further includes a plurality of bound pages connected to the spine.

In some preferred embodiments of the present invention embedded recycled container sheet binder with a spine, the base substrate is a recycled plastic base substrate selected from the group consisting of clear plastic, opaque plastic, colored plastic and combinations thereof.

In some preferred embodiments of the present invention embedded recycled container sheet binder with a spine, the top layer is a recycled plastic selected from the group consisting of clear plastic, opaque plastic and combinations thereof.

In some preferred embodiments of the present invention embedded recycled container sheet binder with a spine, the front cover and the back cover each have at least one straight edge and they are directly connected to one another at the at least one straight edge of each.

In some preferred embodiments of the present invention the embedded recycled container sheet binder the spine includes a plurality of binder fasteners for holding paper.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
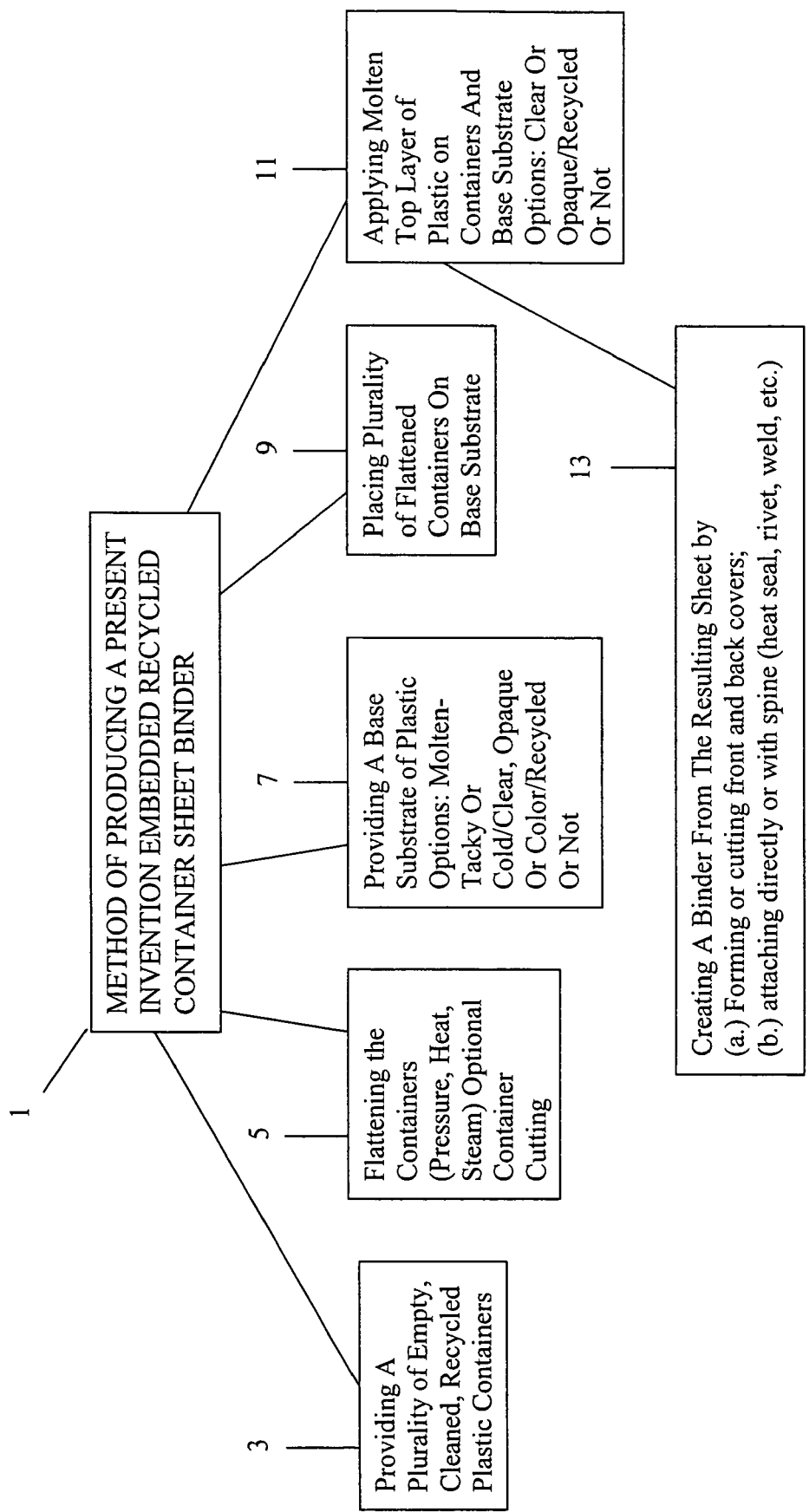
FIG. 1 is a schematic view of a method of producing an embedded recycled container sheet binder according to the present invention.

The present invention relates to a method of producing an embedded recycle sheet binders from recycled plastic containers. The recycled plastic containers are preferably sterilized and are flattened. Flattening may be accomplished by one or more of a number or options. These include optional precutting especially vertically cutting in half, or into smaller sections, followed by soft melting, compression, hot compression, steam deforming, or steam compression such as steam calendaring.

Compression and heating of the containers may be accomplished by slightly melting to deform and flatten the containers. However, the original characteristics of the bottle remain visible, if somewhat obscurely, such as color, design, labels, and shape. The deforming may be such that one will recognize the original bottle. Thus, a Pepsi bottle will be distinguishable from a ginger ale bottle which will be distinguishable from a Coke bottle. PEPSI® is a registered trademark of PepsiCo, Inc., of Purchase, N.Y. COKE® is a registered trademark of The Coca-Cola Company, of Atlanta, Ga. The containers may be on different sizes, shapes, colors and materials (for example, polyethylene, polypropylene, blends or other container plastics). In some cases, labels may be removed from the bottles, but in other cases, they are not removed. Preferably paper labels are not kept. If labels are removed, they may be heat fused or melted. In some cases, the bottles may be chopped, in which case, the bottles may not be as easily identifiable.

In the present invention method, the plurality of empty recycled containers is flattened so that the width (thickness) is reduced by at least 80% and preferably by at least 95%. These flattened recycled plastic containers are dropped onto a base substrate and then both the containers and the base substrate are top-coated to embed the containers. Although not essential to the present invention, when the resulting sheets are designed to be flat, sufficient top coat is applied for a self-leveling flat surface.

The base substrate may be any plastic that will stick to, adhere or otherwise bond to the top coat. The base substrate and the top coat or top layer may be the same or different and are preferably recycled plastic. Polyethylene, polypropylene, poly carbonates, and other plastics and blends may be used and the base substrate may be colored, opaque, transparent, or combinations of these. The top layer must be at least partially transparent or opaque to render the embedded containers visibly recognizable.

In continuous process systems, the base substrate is continuously extruded, the flattened containers are dropped or fed onto molten base substrate and the top layer is applied in molten or liquid state the continuous laminate with the cut embedded containers is cooled and for subsequent use. In other continuous processes, the base substrate could be cooled or partially cooled before the flattened containers are applied, and or the top layer could be a cooled sheet or pellets with subsequent heating or compression and heating. Likewise, batch processes may involve any of the preceding combinations but in fixed dimension molds instead of continuous flow units. The binders are made from the resulting sheets.

Referring now to the drawings, FIG. 1 is a schematic view of a method of producing an embedded recycled container sheet binder 1 from recycled plastic containers 3 according to the present invention.

The method of producing the embedded recycled sheet 1 includes: (a) providing a plurality of empty, preferably cleaned, recycled plastic containers 3; (b) flattening and optionally pre cutting the containers 5; (c) providing a base substrate of plastic 7; (d) placing the plurality of flattened containers on the substrate 9; (e) applying a top layer of plastic over the containers and substrate 11 to form a sheet 11; and, (f) creating a binder product from the sheet so as to retain the visible display of the plurality of deformed identifiable containers 13.

Figure 2:
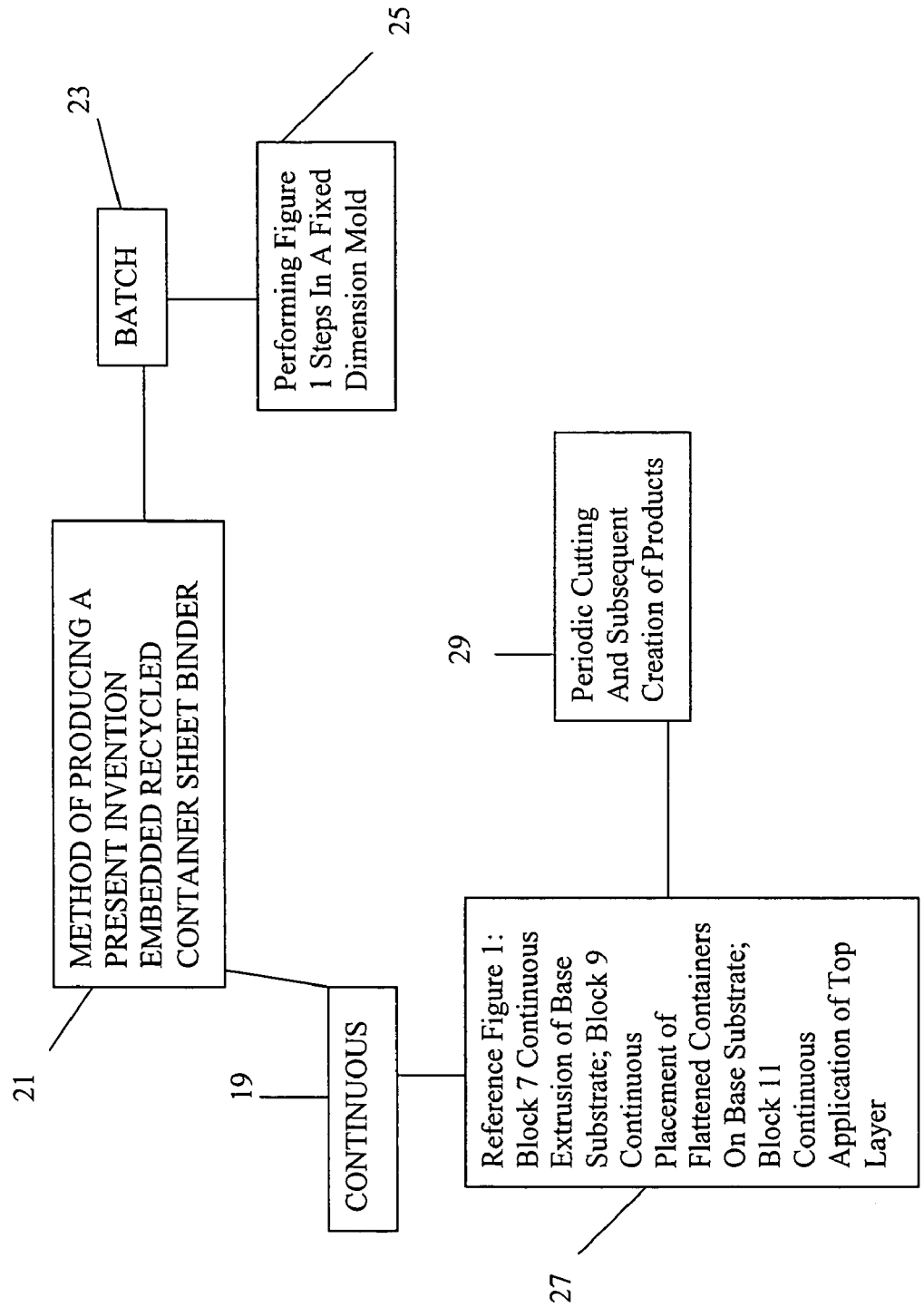
FIG. 2 is a schematic view of a method of producing an embedded recycled container sheet binder products according to the present invention, illustrating a batch process and a continuous process.

FIG. 2 is a schematic view of a method of producing an embedded recycled container sheet binder 21 from recycled plastic bottles according to the present invention, illustrating a continuous process 19 and a batch process 23.

With regard to the batch process 33, the compressed flat composite recycled bottle sheet is formed in a fixed dimension mold 25, which may have predetermined fixed length and width dimensions or may have a non-rectangular fixed shape.

With regard to the continuous process 19, frame 27 shows that the blocks of FIG. 1 (blocks 7, 9, and 11) may be continuous process steps. The resulting sheet may be periodically cut and used to create binder products 29.

Figure 3:
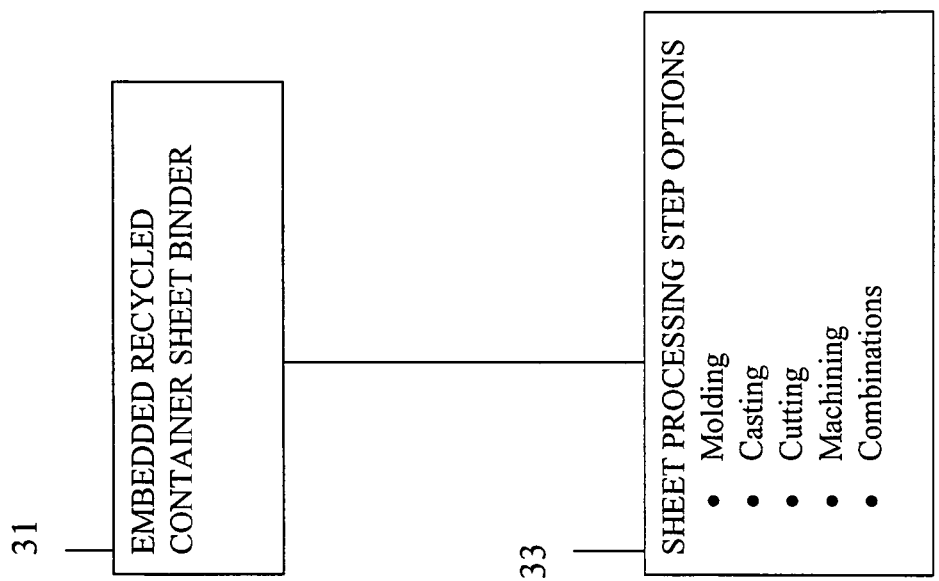
FIG. 3 is a schematic view of a method of producing an embedded recycled container sheet binder according to the present invention, illustrating processing steps for creating the product.

FIG. 3 is a schematic view of a method of producing an embedded recycled container sheet binder 31 from recycled plastic containers according to the present invention.

With regard to box 33, creating the binder products from compressed flat composite recycled bottle sheets includes a processing step selected from molding, casting, cutting, machining and combinations thereof.

Figure 4:
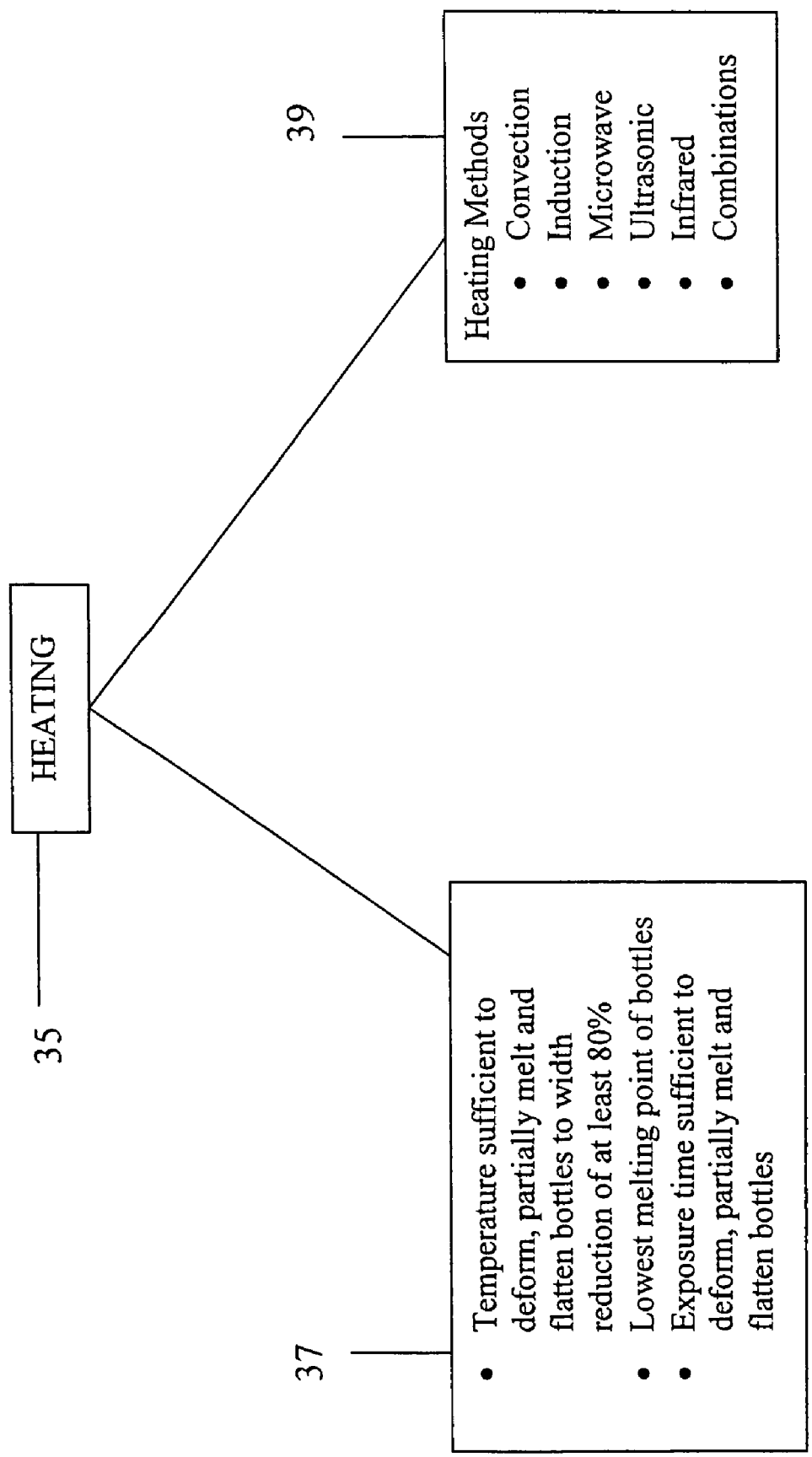
FIG. 4 is a schematic view of a method of producing an embedded recycled container sheet binder according to the present invention, illustrating heating.

FIG. 4 is a schematic view of a method of making an embedded recycled container sheet binder product from recycled plastic bottles according to the present invention, illustrating heating 35. With regard to the box 37, the heating is to a temperature sufficient to deform, partially melt and flatten the bottles, the heating is at a temperature of at least the lowest melting point of the bottles and exposure time is sufficient to deform, partially melt and flatten the bottles. With regard to box 39, the heating is performed utilizing a method selected from the group consisting of convection, induction, microwave, ultrasonic and infrared.

Figure 5:
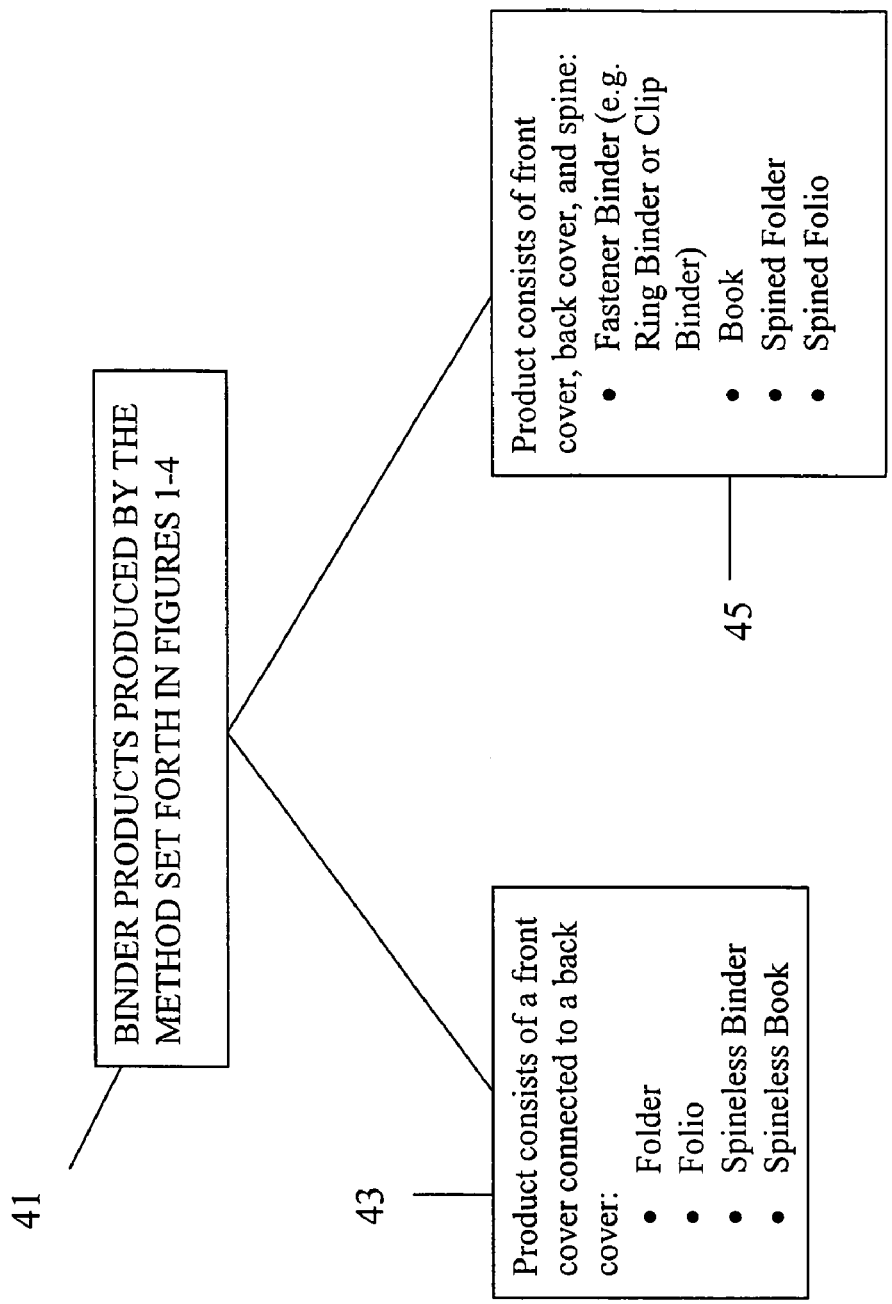
FIG. 5 is a schematic view of a method of producing an embedded recycled container sheet binder according to the present invention, illustrating products created.

FIG. 5 is a schematic view of a method of producing embedded recycled container sheet binder products from recycled plastic containers according to the present invention, illustrating binder products that may be produced 41. With regard to box 43, the product consists of a binder having a front cover and a back cover, and these include a folder, a folio, a spineless binder and a spineless book. With regard to box 45, the products are binders with spines, as shown.

Figure 6:
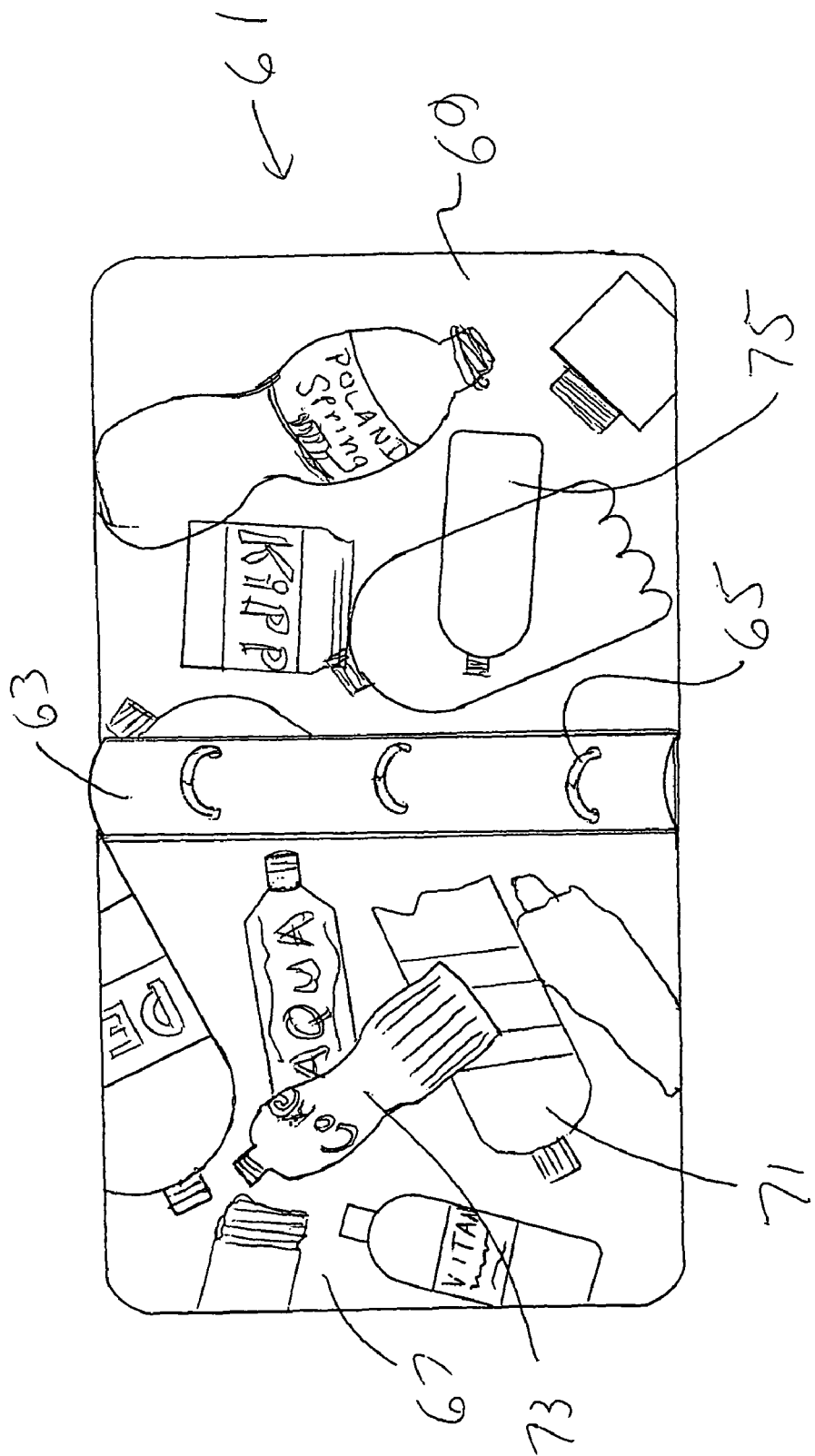
FIG. 6 shows a top view of an open binder created with sheet made by the method of the present invention.

FIG. 6 illustrates one binder product produced by the present invention methods, namely, loose leaf binder 61. The binder 61 has front and back covers 67 and 69, respectively, that are made from the present invention embedded container sheets. The covers 67 and 69 are connected by spine 63 with rings such as ring 65. The covers 67 and 69 are clear recycled plastic sheets formed by present invention methods with embedded flattened recycled plastic containers, such as labeled containers 71 and 73 and unlabeled container 75.

Figure 7:
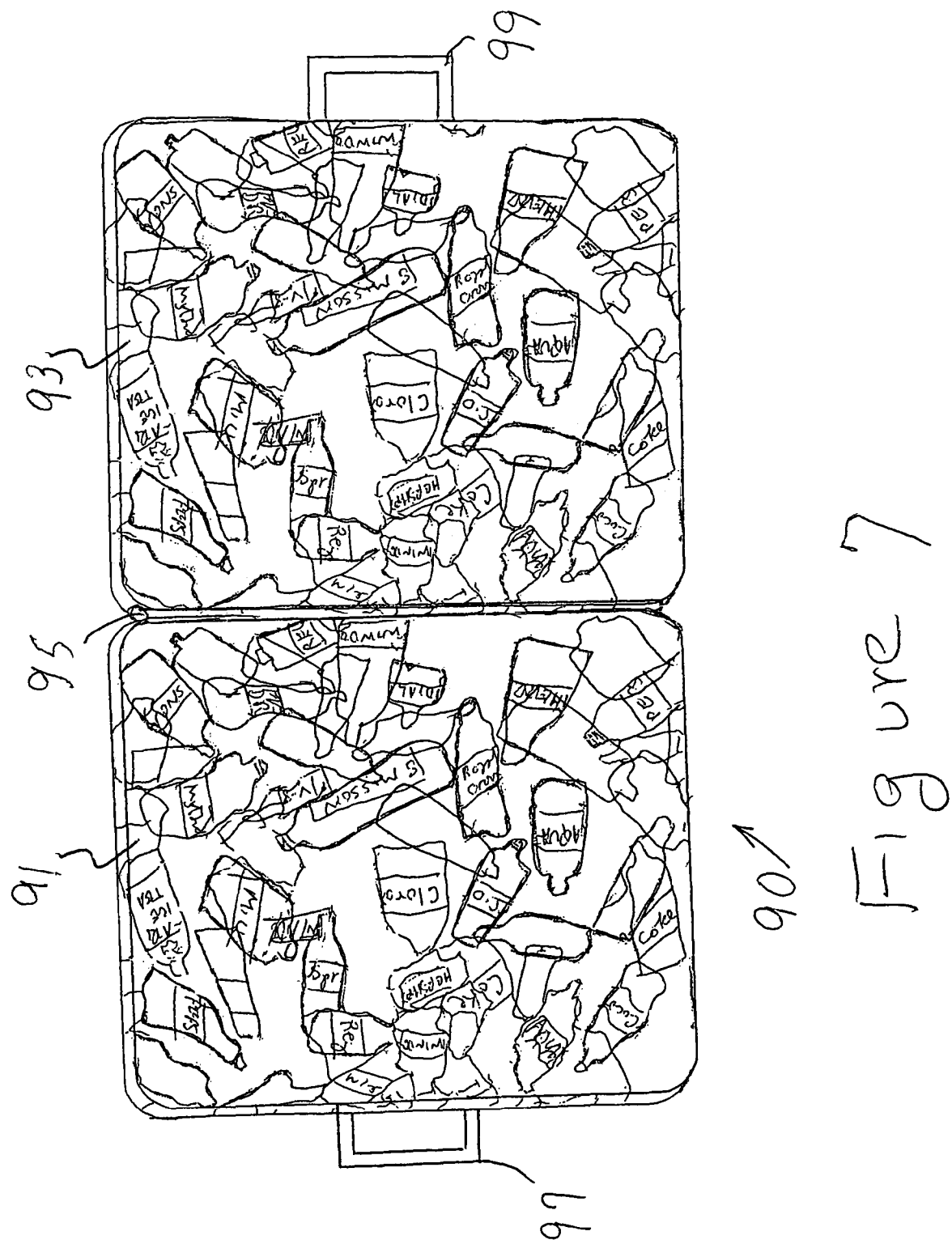
FIG. 7 illustrates a top view of a portfolio binder made by the method of the present invention; and, FIG. 8 illustrates a top view of a present invention pocket binder made by the methods described herein.

FIG. 7 illustrates a top view of a portfolio binder 90 made by the method of the present invention wherein a sheets according to the present invention method are cut or machined into the front cover 91 and rear cover 93. They are heat sealed to plastic hinge assembly 95 and optional handles 97 and 99 may likewise be heat sealed or mechanically attached thereto. Also, option closure hardware, such as snaps, may be included.

FIG. 8 illustrates a top view of a pocket binder 101 made by the method of the present invention wherein sheets according to the present invention method are formed into the covers 101 and 103, with flexible plastic pockets 107 and 109 attached as shown. The two covers are connected (by heat seal, rivets or otherwise) to hinge assembly 105.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An embedded recycled container sheet binder, which comprises:
   a front cover and a back cover, said front cover and said back cover being, at least in part, a plurality of flattened recycled containers embedded in a base substrate of plastic, and each of said plurality of flattened recycled containers being visibly recognizable.

2. The embedded recycled container sheet binder of claim 1 wherein said plurality of flattened recycled containers is embedded between said base substrate of plastic and a top layer of plastic.

3. The embedded recycled container sheet binder of claim 1 wherein said base substrate of plastic is a base substrate of recycled plastic selected from the group consisting of clear plastic, opaque plastic, colored plastic and combinations thereof.

4. The embedded recycled container sheet binder of claim 2 wherein said top layer is a recycled plastic selected from the group consisting of clear plastic; opaque plastic and combinations thereof.

5. The embedded recycled container sheet binder of claim 1 wherein said front cover and said back cover each have at least one straight edge and they are directly connected to one another at said at least on straight edge of each.

6. The embedded recycled container sheet binder of claim 2 wherein both said front cover and said back cover are, at least in part, a plurality of flattened recycled containers, and each of said plurality of flattened recycled containers are visibly recognizable.

7. The embedded recycled container sheet binder of claim 6 wherein said base substrate of plastic is a base substrate of recycled plastic selected from the group consisting of clear plastic, opaque plastic, colored plastic and combinations thereof.

8. The embedded recycled container sheet binder of claim 6 wherein said top layer is a recycled plastic selected from the group consisting of clear plastic, opaque plastic and combinations thereof.

9. The embedded recycled container sheet binder of claim 6 wherein said front cover and said back cover each have at least one straight edge and they are directly connected to one another at said at least one straight edge of each.

10. The embedded recycled container sheet binder of claim 1 wherein at least one of said front cover and said back cover has at least one pocket connected to it.

11. An embedded recycled container sheet binder, which comprises:
a front cover, a back cover and a spine, said front cover and said back cover being connected to said spine for opening and closing, at least one of said front cover and said back cover being, at least in part, a plurality of flattened recycled containers embedded in a base substrate of plastic, and each of said plurality of flattened recycled containers being visibly recognizable.

12. The embedded recycled container sheet binder of claim 11 wherein said plurality of flattened recycled containers is embedded between said base substrate of plastic and a top layer of plastic.

13. The embedded recycled container sheet binder of claim 11 wherein said base substrate of plastic is a base substrate of recycled plastic selected from the group consisting of clear plastic, opaque plastic, colored plastic and combinations thereof.

14. The embedded recycled container sheet binder of claim 12 wherein said top layer is a recycled plastic selected from the group consisting of clear plastic, opaque plastic and combinations thereof.

15. The embedded recycled container sheet binder of claim 11 wherein both said front cover and said back cover are, at least in part, a plurality of flattened recycled containers, and each of said plurality of flattened recycled containers are visibly recognizable.

16. The embedded recycled container sheet binder of claim 12 wherein said binder further includes a plurality of bound pages connected to said spine.

17. The embedded recycled container sheet binder of claim 16 wherein said base substrate is a recycled plastic base substrate selected from the group consisting of clear plastic, opaque plastic, colored plastic and combinations thereof.

18. The embedded recycled container sheet binder of claim 16 wherein said top layer is a recycled plastic selected from the group consisting of clear plastic, opaque plastic and combinations thereof.

19. The embedded recycled container sheet binder of claim 16 wherein said front cover and said back cover each have at least one straight edge and they are directly connected to one another at said at least one straight edge of each.

20. The embedded recycled container sheet binder of claim 11 wherein said spine includes a plurality of binder fasteners for holding paper.

* * * * *